United States Patent [19]
Lehmann et al.

[11] Patent Number: 4,550,396
[45] Date of Patent: Oct. 29, 1985

[54] RETAINING RINGS FOR OPTICAL DISK ASSEMBLIES

[75] Inventors: Robert P. Lehmann; James E. Vianco, both of Rochester, N.Y.

[73] Assignee: Eastman Kodak Company, Rochester, N.Y.

[21] Appl. No.: 458,492

[22] Filed: Jan. 17, 1983

[51] Int. Cl.⁴ .................. G01D 15/32; G11B 5/82
[52] U.S. Cl. .................. 369/284; 29/522 R; 160/392; 346/135.1; 346/137; 369/287
[58] Field of Search .................. 369/284, 286, 287; 220/256, 258, 257, 82 R; 346/135.1, 137; 29/522 R, 449; 160/392

[56] References Cited

U.S. PATENT DOCUMENTS

| 2,797,750 | 7/1957 | Van Dette | 160/392 |
| 3,122,990 | 3/1964 | Fried | 220/82 R |
| 3,302,260 | 2/1967 | Cuddeback | 160/392 |
| 3,720,256 | 3/1973 | Fralick et al. | 160/392 |
| 4,034,460 | 7/1977 | Hulle et al. | 350/320 |
| 4,189,880 | 2/1980 | Ballin | 160/392 |
| 4,261,144 | 4/1981 | Rizzo | 160/392 |
| 4,365,258 | 12/1982 | Geyer et al. | 369/284 |
| 4,448,345 | 5/1984 | Helms | 220/258 |
| 4,453,246 | 6/1984 | Covington | 360/135 |

Primary Examiner—Steven L. Stephan
Attorney, Agent, or Firm—Milton S. Sales

[57] ABSTRACT

An optical disk assembly includes a web assembly having a flexible disk-shaped support web carrying a record layer. The support web has an information storage region. A pair of annular retaining ring members engage opposite sides of an annular peripheral region of the web assembly to clamp the support therebetween are formed from malleable stock material which is deformed during assembly of the optical disk assembly to provide a locking interfit therebetween with the peripheral region of the web assembly interleaved between the ring members. The peripheral region of the support is wrapped about an annular reference surface of one ring member and is pushed into an annular recess with undercut area in that ring member. The other ring member is deformed into the recess undercut.

4 Claims, 7 Drawing Figures

RETAINING RINGS FOR OPTICAL DISK ASSEMBLIES

CROSS-REFERENCE TO RELATED APPLICATION

Reference is made herein to commonly-assigned, copending U.S. patent applications Ser. No. 438,565, filed Nov. 3, 1982 in the names of K. G. Budinski and K. F. Brandon entitled OPTICAL DISK ASSEMBLY RETAINING RINGS, and U.S. Ser. No. 458,430, filed concurrently herewith in the name of P. Affolter entitled OPTICAL DISK ASSEMBLY RETAINING RINGS.

BACKGROUND OF THE INVENTION

1. Field of the Invention

The present invention relates to record medium assemblies useful in high density storage of information by optical writing and/or reading, and more particularly to improved configurations for optical disk assembly retaining rings.

2. Description of the Prior Art

The currently preferred optical disk technology employs disk elements with spiral or concentric tracks of minute (e.g., on the order of a micron or less in size), optically-detectable marks. One real-time mode of recording (writing) such marks is by scanning tracks on the disk with an equivalently small beam of radiation (e.g., from a laser) which is modulated "off or on" according to an electrical signal representative of the information to be written. Information is recovered (read) by scanning the tracks with the same size or only slightly larger, but still very tightly focused, radiation (e.g. light) spot. The recovered information is in the form of a fluctuating electrical signal obtained from a photodetector that senses the read-out light reflected from the recorded disk.

In order to write and read information in the form of such minute markings, optical systems of high numerical aperture are used to focus light to equivalently minute spots. Such optical systems have extremely small depths of focus and the proper positional relation between the writing or reading optical system, and the optical disk record surface must be stringently maintained both smooth and flat.

One approach to achieve requisite smoothness, flatness and protective requirements for high density storage of information is disclosed in commonly-assigned U.S. Pat. No. 4,365,258, issued Dec. 21, 1982 to F. F. Geyer and E. M. Leonard. In that approach an improved optical disk assembly adapted for high density storage of information comprises (i) a flexible, disk-shaped support carrying a record layer; (ii) a transparent disk-shaped cover sheet opposing the record layer, and (iii) an annular retaining ring for holding the support and cover sheet in circumferentially-symmetric tension.

Commonly-assigned, copending U.S. patent application Ser. No. 438,565, filed Nov. 3, 1982 in the names of K. G. Budinski and K. F. Brandon discloses an optical disk assembly having a pair of formed metal ring members which close together upon opposite sides of the support web. Cooperative surfaces on the ring members provide a locking interfit to inhibit separation of the ring members. Although the formed metal ring members have proven to be highly successful, they do require close manufacturing tolerances to ensure a proper locking interfit. These drawbacks have been partially overcome by the optical disk assembly by providing one preformed ring member with an annular undercut recess, and a second, malleable ring member which can be deformed into the recess undercut to interlock with the first ring member. Because the second ring member is malleable and deformed, manufacturing tolerances can be relaxed somewhat to enhance manufacturability.

SUMMARY OF THE INVENTION

An optical disk assembly in accordance with the invention includes a web assembly including a flexible disk-shaped support web and preferably an opposed cover sheet. The support carries a record layer with an information storage region.

A pair of annular retaining ring members engage opposite sides of an annular peripheral region of the support to clamp the support therebetween. The ring members are formed from malleable stock material which is deformed during assembly of the optical disk assembly to provide a locking interfit therebetween with the peripheral region of the web assembly interleaved between the ring members. One of the ring members is initially deformed into a shape having a recess with an undercut area. The peripheral region of the web assembly is wrapped about an annular reference surface on that ring member and is pushed into the recess. The other ring member is deformed into the recess undercut area. In the preferred, illustrated embodiment of the present invention, each ring member is formed from a ring of tubular stock material.

The invention and its objects and advantages, will become more apparent in the detailed description of the preferred embodiments presented below.

BRIEF DESCRIPTION OF THE DRAWINGS

The description of preferred embodiments refers to the attached drawings wherein.

DESCRIPTION OF THE PREFERRED EMBODIMENTS

Figure 1:
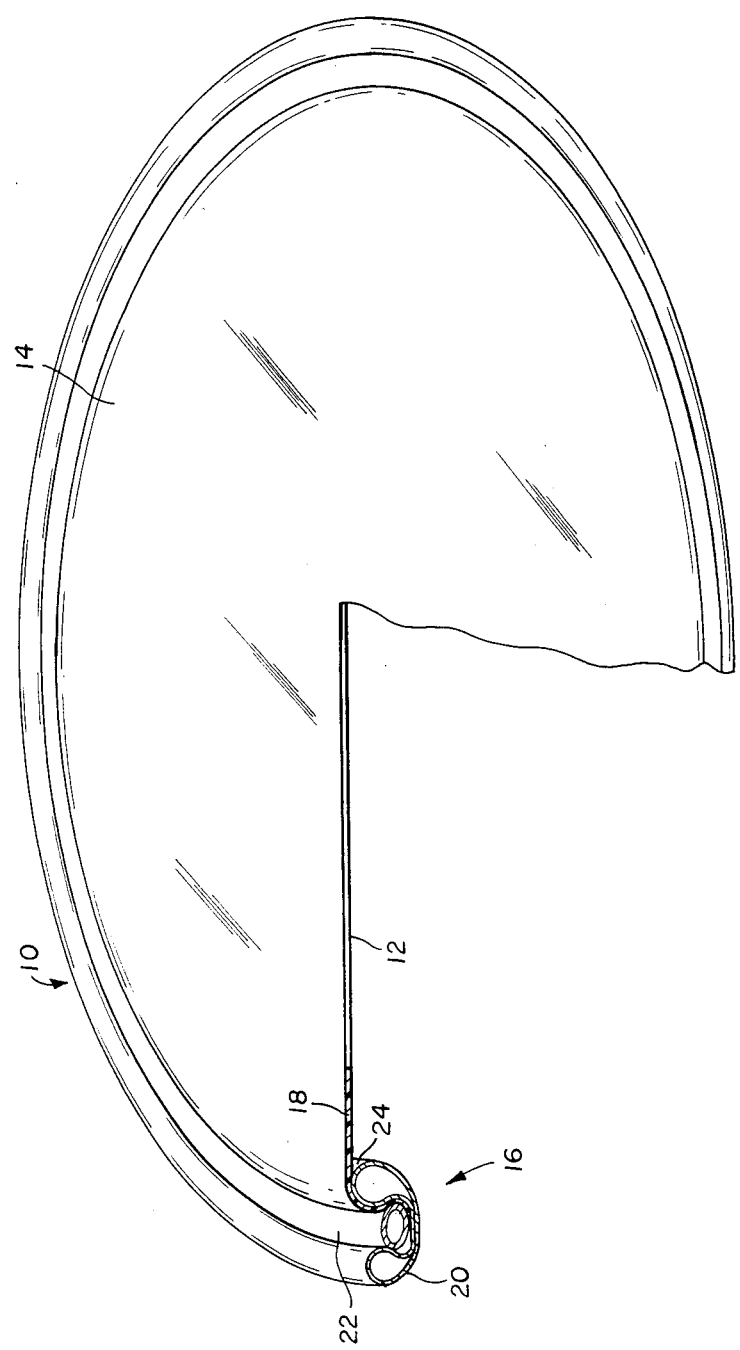
FIG. 1 is a perspective view of one embodiment of an optical disk assembly according to the present invention.

Referring to FIG. 1, an optical disk assembly 10 includes a web assembly having a flexible, disk-shaped support web 12 carrying a record layer (and other appropriate layers) on one major surface of the support web. The web assembly also includes a continuous, flexible, disk-shaped cover sheet 14 which is substantially transparent with respect to the write and/or read wavelength suitable for use with the record layer. The diameter of cover sheet 14 corresponds generally to the diameter of support web 12.

Figure 7:
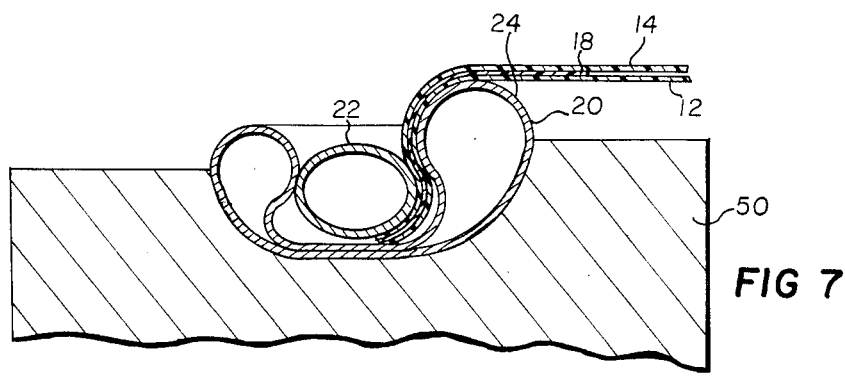

The support web and cover sheet are held in spaced relation by an annular composite retaining ring 16 and spacer 18. The retaining ring engages support web 12 and cover sheet 14 substantially continuously at respective annular peripheral portions thereof. Details of the web assembly may better be seen in FIG. 7, which is drawn to larger scale. The web assembly has a predetermined information storage region radially inwardly of retaining ring 16 and spacer 18. Reference is made to aforementioned U.S. Pat. No. 4,365,258 for a description of useful and preferred materials and characteristics for the disk-shaped support web and the cover sheet.

The web assembly is retained in circumferentially-symmetric tension by cooperating first and second annular ring members 20 and 22, respectively, of composite retaining ring 16 engaging opposed sides of the peripheral region of the web assembly. Retaining ring member 20 has an annular reference surface 24 against which support web 12 is positioned to locate the recording layer in a predetermined plane. Ring member 20 also has an annular recess with a generally U-shaped cross-sectional shape open at the side facing support 12. Each radial end of the recess has a profile sloping inwardly towards the open side of the recess to form undercut areas. Second ring member 22 extends into the undercut regions to clamp the web assembly and to provide a locking interfit.

It is preferred that the cooperative engagement between disk-shaped support web 12, cover sheet 14, and spacer 18 significantly seal the space between the record layer on support web 12 and the opposed surface of cover sheet 14. Although not included in the illustrated embodiments, the optical disk assembly may have a central rigid hub including spacing means for maintaining proper spacing between the record layer and the cover sheet.

Preferred tensions for the disk-shaped support and cover sheet materials are from substantially zero to just below the elastic limit, or yield point, of those materials. More specifically, the preferred tensions depend upon the desired degree of planarity for the particular member (i.e. size, composition, etc.). It is preferred that support web material tension be below the elastic limit of the particular material; however, in certain applications some yield can be acceptable as long as surface planarity remains in the desired tolerance. In general, the tension should be selected with respect to the support web material so that the stressed material's continuous relaxation over time (i.e. material creep) is slow enough to insure adequate spacing and planarizing tension throughout the expected product life period.

Figure 2:
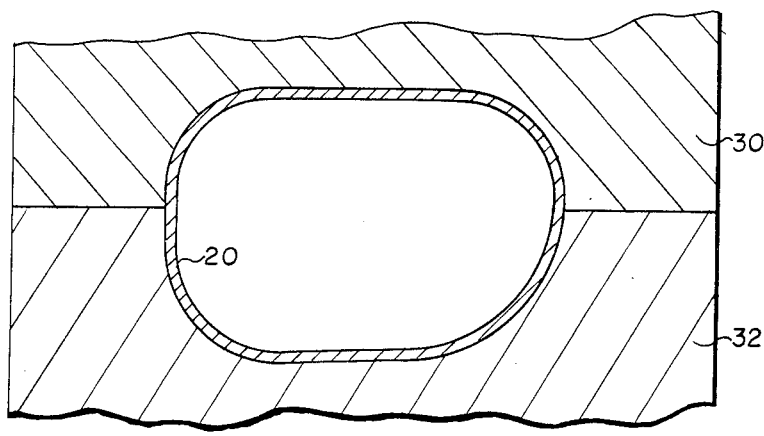
FIG. 2 is a sectional view taken through line 2—2 of FIG. 1.

In the preferred embodiment, first ring member 20 is formed from a workpiece of tubular stock material having a circular cross-sectional shape. Several forming steps result in the final shape shown in FIG. 1. The tubular stock material is placed between a die 30 and punch 32 (FIG. 2) configured to flatten the tube to an initial shape as shown in that figure.

Figure 3:
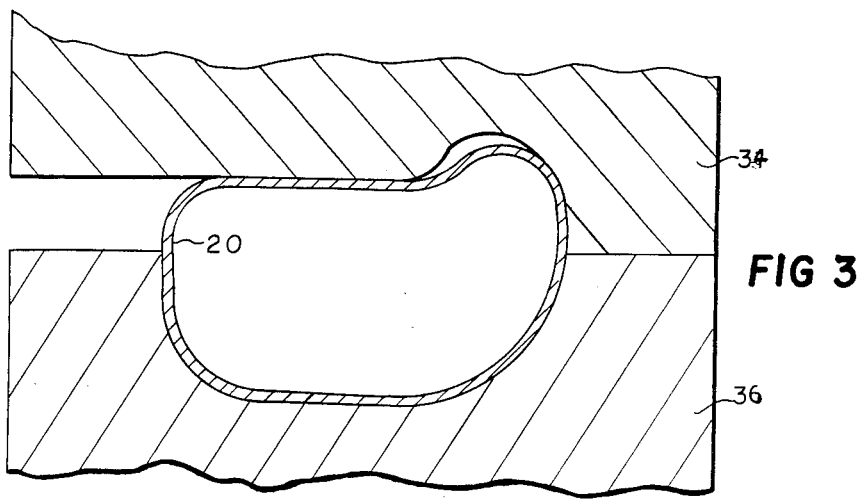
FIGS. 3–5 are sequential sectional views showing stages in partially forming the first ring member of the disk assembly of FIG. 1.
Figure 4:
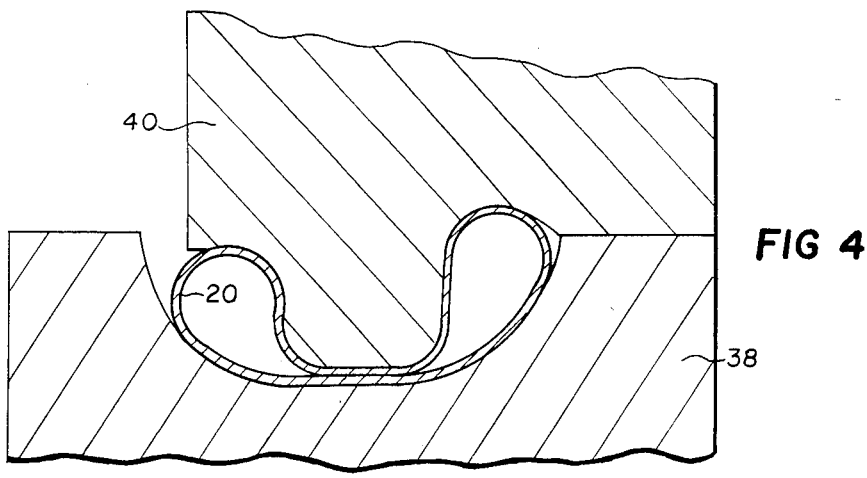
Figure 5:
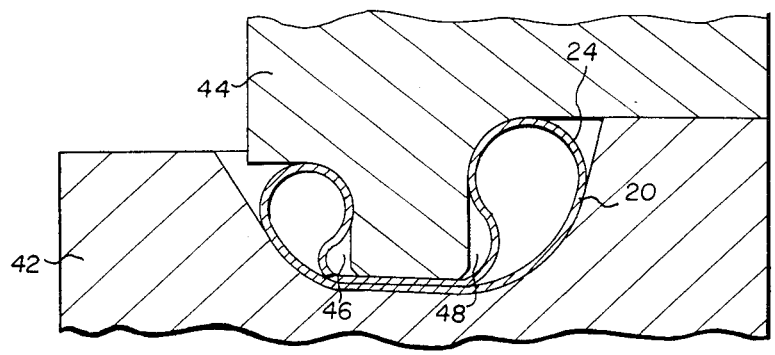

The next die and punch 34 and 36, respectively, continue the shaping process as shown in FIG. 3. The workpiece which will become ring member 20 is next placed between die 38 and punch 40. As the punch closes on the workpiece, a recess is formed open at one side. By crimping in the edges of the workpiece between die 42 and punch 44 (FIG. 5), undercut areas 46 and 48 are formed. The workpiece cross-sectional shape shown in FIG. 5 is substantially that of ring member 20 as it will be in the final disk assembly.

Figure 6:
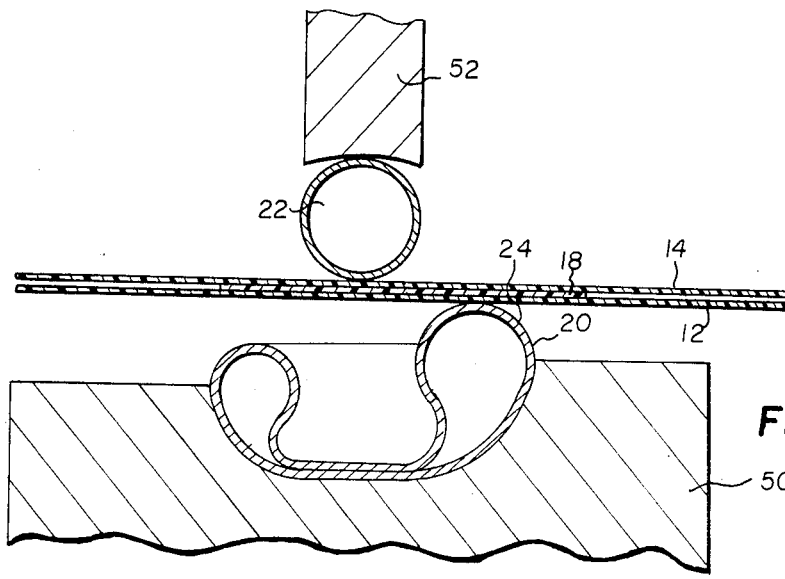
FIGS. 6 and 7 are sequential sectional views showing stages in the final assembly process of the manufacture of the disk assembly of FIG. 1.

During the final assembly operation, support web 12 and cover sheet 14 are placed under circumferentially-symmetric radial tension with ring member workpieces on opposed sides thereof (FIG. 6). The ring workpieces are aligned with annular spacer 18, and brought together (FIG. 7) by a die and punch 50 and 52, respectively to press the web assembly around reference surface 24. As ring member 22 moves into the recess in ring member 20, it begins to deform and fill the recess. When ring member 22 extends into the undercut areas of the recess, the assembly is locked together. Now the web can be cut free of the tensioning mechanism, not shown.

In the illustrated embodiment, the ring members are preferably formed from annular tubes of malleable material, although solid rings could indeed be used.

The invention has been described in detail with particular reference to certain preferred embodiments thereof, but it will be understood that variations and modifications can be effected within the spirit and scope of the invention.

We claim:

1. An optical disk assembly comprising:
A. a flexible, disk-shaped web assembly carrying a record layer, said web assembly having an information storage region and an annular peripheral region radially outward of said storage region; and
B. an annular retaining ring engaging said peripheral region of said web assembly, said retaining ring including
  (1) a first ring member on one side of said web assembly, said first ring member having been formed from malleable stock material into a shape having an annular recess with
    (a) a generally U-shaped cross-sectional shape open at the side facing said web assembly and
    (b) an undercut area, and
  (2) a second ring member formed from malleable stock material on the other side of said web assembly, said second ring member stock material having been deformed into said recess and said undercut area to provide a locking interfit with said first ring member, and with said annular peripheral region of said web assembly interleaved between the ring members in clamped circumferentially-symmetric tension.

2. An optical disk assembly comprising:
A. a flexible, disk-shaped web assembly carrying a record layer, said web assembly having an information storage region and an annular peripheral region radially outward of said storage region; and
B. an annular retaining ring engaging said peripheral region of said web assembly, said retaining ring including
  (1) a first ring member on one side of said web assembly, said first ring member having been formed from malleable stock material into a shape having an annular recess with
    (a) a generally U-shaped cross-sectional shape open at the side facing said web assembly,
    (b) an undercut area, and
    (c) an annular reference surface radially inwardly of said recess against which said web assembly can be positioned to locate said record layer in a predetermined plane, and
  (2) a second ring member formed from malleable stock material on the other side of said web assembly, said second ring member stock material having been deformed into said recess and said undercut area to provide a locking interfit with said first ring member, and with said annular peripheral region of said web assembly positioned against said annular reference surface and interleaved between the ring members in clamped circumferentially-symmetric tension.

3. An optical disk assembly comprising:
   A. flexible, disk-shaped web assembly including
      (1) a support web carrying a record layer and
      (2) a cover sheet spaced from and opposing said record layer, said web assembly having an information storage region and an annular peripheral region radially outward of said storage region; and
   B. an annular retaining ring engaging said peripheral region of said web assembly, said retaining ring including
      (1) a first ring member on one side of said web assembly, said first ring member having been formed from malleable stock material into a shape having an annular recess with
         (a) a generally U-shaped cross-sectional shape open at the side facing said web assembly,
         (b) an undercut area, and
         (c) an annular reference surface radially inwardly of said recess against which said support can be positioned to locate said record layer in a predetermined plane, and
      (2) a second ring member formed from malleable stock material on the other side of said web assembly, said second ring member stock material having been deformed into said recess and said undercut area to provide a locking interfit with said first ring member, and with said annular peripheral region of said web assembly positioned against said annular reference surface and interleaved between the ring members in clamped circumferentially-symmetric tension.

4. An annular retaining ring for receiving a flexible, disk-shaped web assembly having a record layer, an information storage region, and an annular peripheral region radially outward of the storage region; said annular retaining ring engaging the peripheral region of said web assembly and comprising:
   a first ring member on one side of the web assembly, said first ring member having been formed from malleable stock material into a shape having an annular recess with (1) a generally U-shaped cross-sectional shape, open at the side facing the web assembly and (2) an undercut area; and
   a second ring member formed from malleable material on the other side of said web assembly, said second ring member stock material having been deformed into said recess and said undercut area to provide a locking interfit with said first ring member; and with the annular peripheral region of the web assembly interleaved between the ring members in clamped circumferentially-symmetric tension.

* * * * *